United States Patent [19]

Starkweather

[11] 4,034,408
[45] July 5, 1977

[54] FLYING SPOT SCANNER

[75] Inventor: Gary K. Starkweather, Saratoga, Calif.

[73] Assignee: Xerox Corporation, Stamford, Conn.

[22] Filed: July 7, 1975

[21] Appl. No.: 593,891

Related U.S. Application Data

[63] Continuation of Ser. No. 488,332, July 15, 1974, abandoned, and Ser. No. 519,378, Oct. 30, 1974, abandoned, which is a continuation-in-part of Ser. No. 488,332, , which is a continuation of Ser. No. 309,859, Nov. 27, 1972, abandoned.

[52] U.S. Cl. .......................................... 358/293
[51] Int. Cl.² ........................................ H04N 1/10
[58] Field of Search .................... 178/7.6, DIG. 27; 350/7, 285

[56] References Cited

UNITED STATES PATENTS

| | | | |
|---|---|---|---|
| 3,465,347 | 9/1969 | Hudson | 350/314 |
| 3,619,039 | 11/1971 | Beiser | 350/285 |
| 3,646,568 | 2/1972 | Woywood | 178/7.6 |
| 3,750,189 | 7/1973 | Fleischer | 350/7 |

Primary Examiner—Robert L. Griffin
Assistant Examiner—Michael A. Masinick
Attorney, Agent, or Firm—M. J. Colitz; T. J. Anderson; L. Zalman

[57] ABSTRACT

A flying spot scanning system is provided by utilizing reflected light from a multifaceted rotating polygon which is then directed to the scanned medium. A light source illuminates at least two contiguous facets of the polygon during each scanning cycle, to provide the desired sequence of spot scanning. To assure a uniform spot size at the scanned medium, an optical convolution of elements is selected in combination with the light source such that an adequate depth of focus at the medium is assured. In each scanning cycle, information is transmitted to the scanned medium by modulating the light from the light source in accordance with a video signal.

6 Claims, 5 Drawing Figures

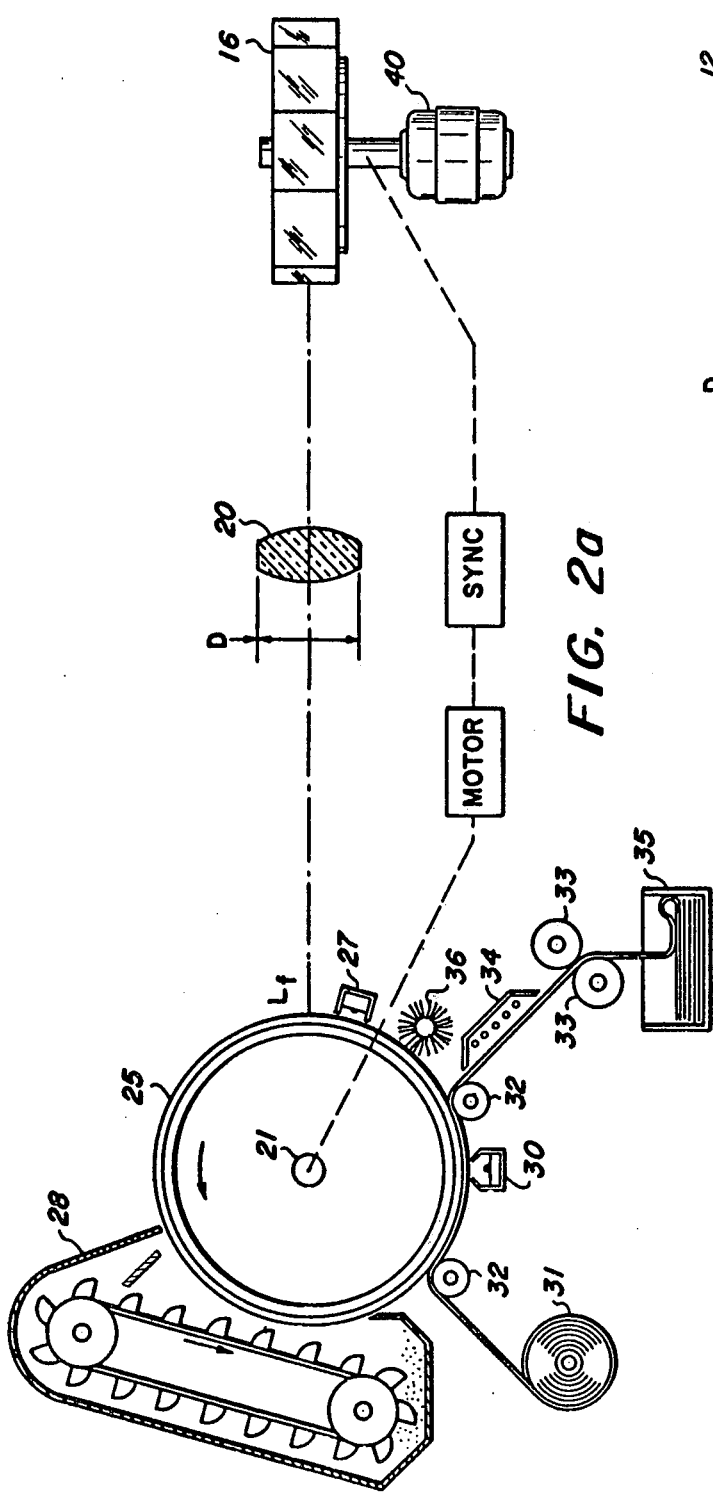
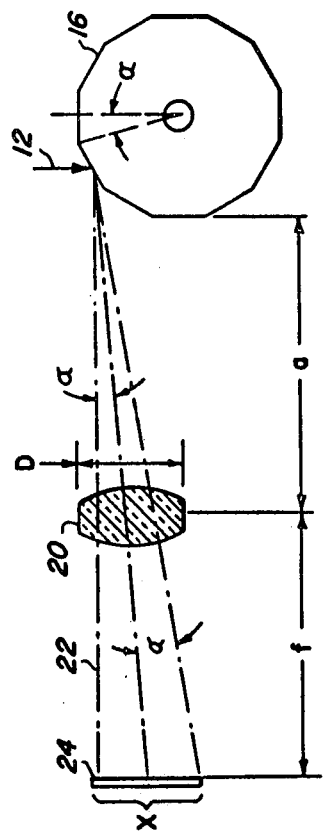
FIG. 2a
FIG. 2b

FLYING SPOT SCANNER

BACKGROUND OF THE INVENTION

This application is a continuation application of a first copending application Ser. No. 488,332, filed July 15, 1974, which in turn is a continuation of application Ser. No. 309,859, filed Nov. 27, 1972, now abandoned, and a second copending application Ser. No. 519,378, filed Oct. 30, 1974, which in turn is a continuation-in-part of application Ser. No. 488,332, filed July 15, 1974.

This invention relates to a flying spot scanning system for communicating video information to a scanned medium, and more particularly to a scanning system which utilizes a multifaceted rotating polygon for controlling the scanning cycles.

Much attention has been given to various optical approaches in flying spot scanning for the purpose of imparting the information content of a modulated light beam to a scanned medium. Galvanometer arrangements have been used to scan the light across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

One such effort is that described in U.S. Pat. No. 3,675,016. The approach used was to make the spot size invariant and as small as possible by defining the dimensions of the focused beam so that only part, preferably, half, of a mirror facet is illuminated during scanning. This teaching alludes to generalized techniques for assuring the constancy of the size of the aperture of a rotating mirror scanning system. By either illuminating several facets of the mirror or by directing light in a beam that is sufficiently narrow to assure that less than a full facet is the most that can ever be illuminated by the beam and limiting scanning to that portion of the rotary travel of the facet when such facet is illuminated by all of such light beam. However, such system apertures are dimensionally invariant because the dimensions of the rotating facets have no influence on such apertures.

While the system as described in U.S. Pat. No. 3,675,016 may have advantages over the prior art, nevertheless, various constraints must be imposed upon the spot size and other relationships of optical elements within the system which are not always desirable.

It is thus an object of the present invention to provide a flying spot scanning system which avoids such constraints.

It is a further object of the present invention to provide a spot scanning system which utilizes a multifaceted rotating polygon for controlling scanning cycles.

It is yet another object of the present invention to provide a spot scanning system which provides an effective uniform spot size at the contact loci of the spot with the scanned medium.

It is still another object of the present invention to provide a spot scanning system which assures an improved sequence of scanning cycles.

It is also an objective of the present invention to provide a flying spot scanning system which utilizes a multifaceted rotating polygon such that a high duty cycle is realized.

Other objects of the invention will be evident from the description hereinafter presented.

SUMMARY OF THE INVENTION

The invention provides a flying spot scanning system which employs a multifaceted rotating polygon as the element for directing a beam of light to focus to a spot upon a medium and for enabling the spot to traverse the medium throughout a scan width. A light source, such as a laser, generates a beam of light substantially orthogonal to the facets of the polygon which illuminated facets in turn reflect the impinging light beam toward the medium in successive scanning cycles. Additional optical elements are provided in convolution with the light source and the polygon to provide a desirable depth of focus of the spot and a sufficient resolution of the optical system.

A feature of the invention is that the beam of light incident upon the multifaceted polygon illuminates at least two contiguous facets of the polygon during each scanning cycle (in other words, more than two contiguous facets at a given instant of time) to provide the desired sequence of spot scanning. Such feature provides a flying spot scanning system which has an extremely high duty cycle.

Another feature of the invention is that a very large depth of focus is provided for the spot at the contact loci at the surface of the scanned medium. This feature is provided by utilizing a finite conjugate imaging system in convolution with the light beam and the rotating polygon. A doublet lens, in series with a convex imaging lens between the light source and the medium provides such an arrangement. The doublet lens enables the original light beam to be sufficiently expanded for illuminating multiple contiguous facets of the polygon, whereas the imaging lens converges the expanded beam to focus at the contact loci on the surface of the scanned medium. Employing such an optical system assures a uniform spot size at the scanned medium even though a substantial scan width is traversed by the spot.

Still another feature of the invention is the modulation of the original light beam by means of a video signal. The information content within the video signal is thereby imparted to the light beam itself. The medium to be scanned is one which is responsive to the modulated beam and records its information content as contained within the scanning spot in a usable form on its surface across the scan width.

Yet another feature of the invention includes an embodiment of the flying spot scanning system for utilization in high speed xerography. The scanned medium in such an embodiment would consist of a xerographic drum which rotates consecutively through a charging station, an exposure station where the spot traverses the scan width of the drum, through a developing station, and a transfer station where a web of copy paper is passed in contact with the drum and receives an electrostatic discharge to induce the transfer of the developed image from the drum to the copy paper. A fusing device then fixes the images to the copy paper as it passes to an output station.

These and other features which are considered to be characteristic of this invention are set forth with particularlity in the appended claims. The invention itself, however, as well as additional objects and advantages thereof, will best be understood in the following description when considered in conjunction with the accompanying drawings.

DESCRIPTION OF THE DRAWINGS

FIGS. 2a and 2b are perspective views of the utilization of the scanning beam generated by the system of FIG. 1 and embody additional features of the invention;

DESCRIPTION OF THE PREFERRED EMBODIMENT

Figure 1:
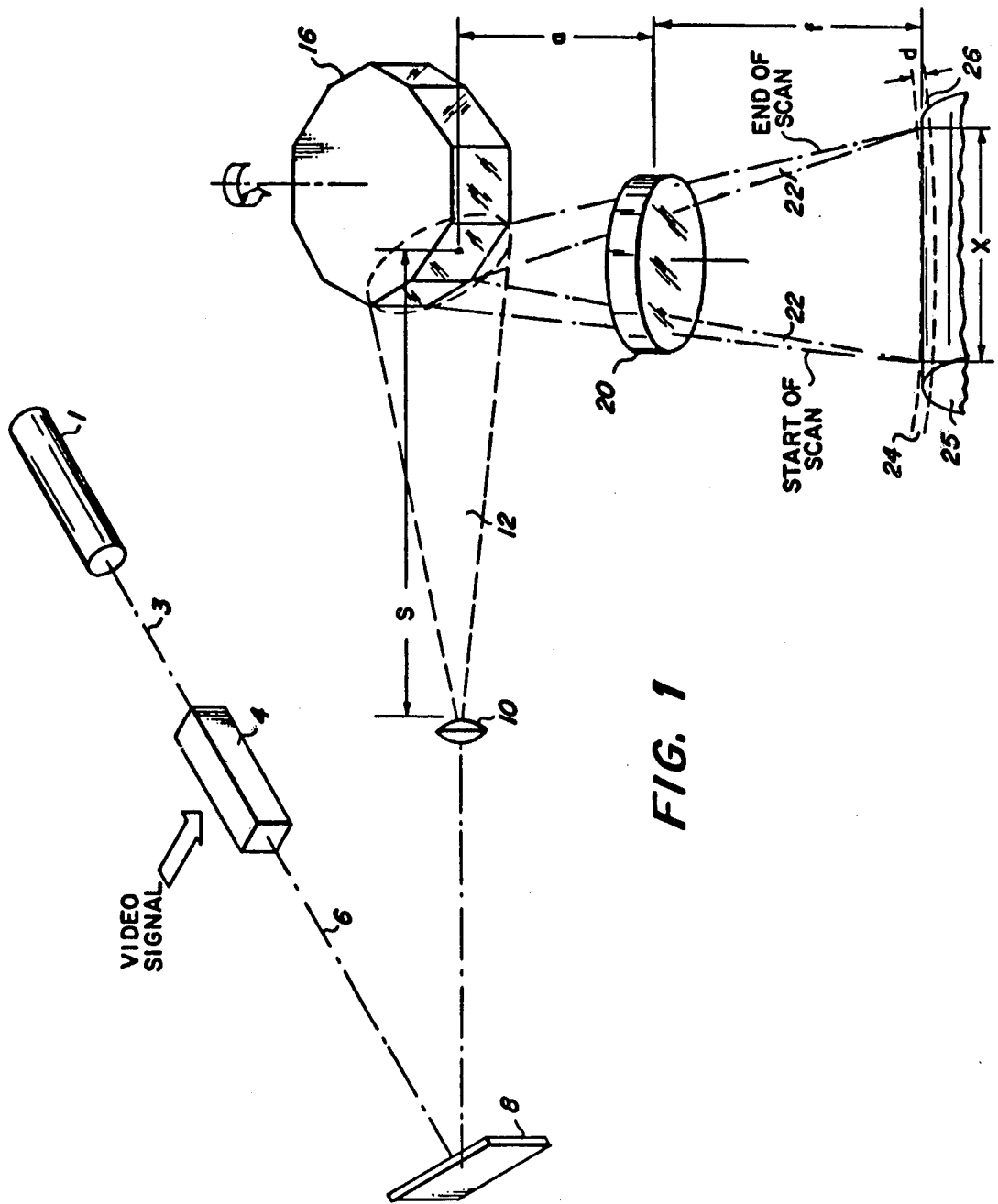
FIG. 1 is an isometric illustration of a flying spot scanning system in accordance with a first embodiment of the invention.

In FIG. 1, an embodiment of a flying spot scanning system in accordance with the invention is shown. A light source 1 provides the original light beam for utilization by the scanning system. The light source 1 is preferably a laser which generates a collimated beam of monochromatic light which may easily be modulated by modulator 4 in conformance with the information contained in a video signal.

Modulator 4 may be any suitable electro-optical modulator for recording the video information in the form of a modulated light beam 6 at the output of the modulator 4. The modulator 4 may be, for example, a Pockel's cell comprising a potassium dihydrogen phosphate crystal, whose index of refraction is periodically varied by the application of the varying voltage which represents the video signal. The video signal may contain information either by means of binary pulse code modulation or wide-band frequency code modulation. In any event, by means of the modulator 4, the information within the video signal is represented by the modulated light beam 6.

The light beam 6 is reflected from mirror 8 in convolution with a doublet lens 10. The lens 10 may be any lens, preferably of two elements, which elements are in spaced relation to each other such that the external curved surfaces are provided in symmetry with the internal surfaces. Preferably the internal surfaces of lens 10 are cemented together to form a common contact zone. Of course, as is often the case in the embodiment of such a lens as a microscope objective, the elements may be fluid spaced. The lens 10 is required to image the axial point of beam 6 through a focal point on the opposite side of lens 10. At the focal point, beam 6 diverges or expands to form beam 12 which impinges upon at least two contiguous facets of a scanning polygon 16.

In the embodiment shown in FIG. 1, the rotational axis of polygon 16 is orthogonal to the plane in which light beams 6 travels. The facets of the polygon 16 are mirrored surfaces for the reflection of any illuminating light impinging upon them. With the rotation of the polygon 16, a pair of light beams 22 are reflected from the respective illuminated facets and turned through a scan angle for flying spot scanning. Alternatively, flying spot scanning could be provided by any other suitable device, such as mirrored piezoelectric crystals or planar reflecting mirrors which are driven in an oscillatory fashion.

In the arrangements, which may be utilized in FIG. 1, however, the reflecting surfaces would be at a distance S from the originating focal point of light beam 12 and in orthogonal relation to the plane bounded by the beam 6 such that the reflected beams would be in substantially the same plane as beam 6.

At a distance a from the leading illuminated facet of polygon 16 is positioned an imaging lens 20. Lens 20 is of a diameter D to cooperate with the respective reflected light beams throughout an angle of $2\alpha$ to render convergent beams 22 which define a focal plane 24 at a distance f from the imaging lens 20. In this preferred embodiment, imaging lens 20 is a five element compound lens as disclosed in U.S. patent application Ser. No. 130,134, which was filed on Apr. 1, 1971 and assigned to the assignee of the present invention. The focal plane 24 is proximate a recording medium 25 whose surface 26 is brought in contact with the respective focal spots of the convergent light beams throughout a scan width $x$.

A uniform spot size is assured throughout the scan width $x$ even though a curved focal plane 24 is defined throughout the scanning cycle. The lens 10 in convolution with the imaging lens 20 provides a finite conjugate imaging system which allows a large depth of focus d which is co-extensive with the contact loci of a spot throughout the scan width $x$ on the surface 26 of the medium 25.

It is to be noted that identical elements in each of the figures are identified by the same reference numerals.

Figure 3:
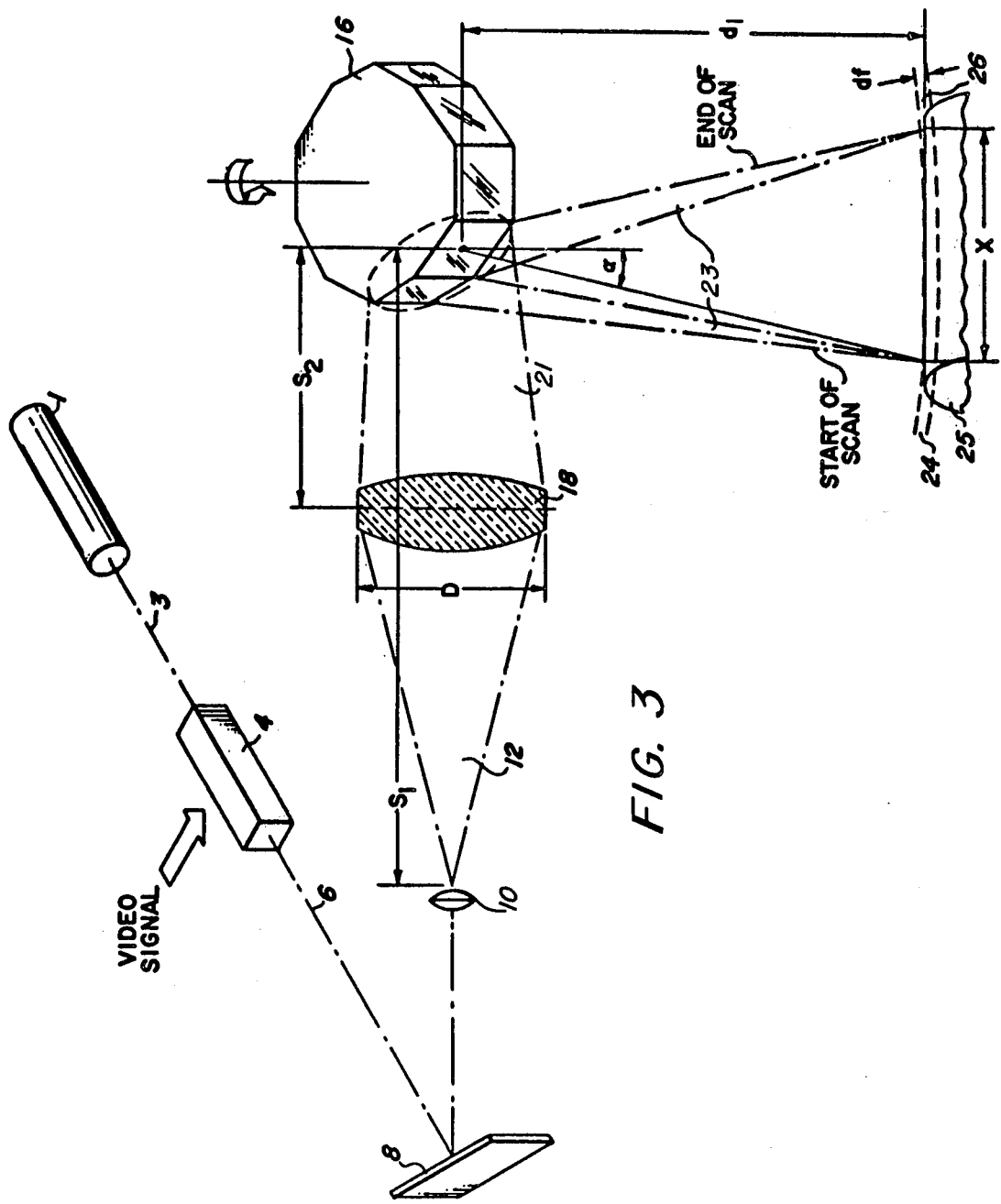
FIG. 3 is an isometric illustration of a flying spot scanning system in accordance with a second embodiment of the invention.

Referring now to the embodiment shown in FIG. 3, an imaging lens 18 is positioned at a distance $S_2$ from the leading illuminated facet of polygon 16. Lens 18 is of a diameter D to cooperate with the expanded light beam 12 to render a convergent beam 21 which illuminates the desired facets to reflect respective light beams 23 to focus to focal plane 24 at a distance $d_1$ from the polygon 16. In this preferred embodiment, imaging lens 18 is a 1–n element lens. The focal length $f$ of lens 18 is related to $S_1$, $S_2$ and $d_1$ by the following thin lens equation:

$$\frac{1}{S_1} + \frac{1}{S_2 + d_1} = \frac{1}{f}$$

As set forth hereinabove with reference to FIG. 1, the rotational axis of polygon 16 is orthogonal to the plane in which light beams 6 travel, the facets of the polygon 16 being mirrored surfaces for the reflection of any illuminating light impinging upon them. With the rotation of the polygon 16, assuming two contiguous facets are illuminated at a given time, a pair of light beams 23 are reflected from the respective illuminated facets and turned through a scan angle $\alpha$ for flying spot scanning. Alternatively, flying spot scanning could be provided by any other suitable device, such as mirrored piezoelectric crystals or planer reflecting mirrors which are driven in an oscillatory fashion.

In the arrangements which may be utilized in FIG. 3, however, the reflecting surfaces would be at a distance $S_1$ from the originating focal point of light beam 12 and in orthogonal relation to the plane bounded by the beam 6 such that the reflected beams would be in substantially the same plane as beam 6.

The focal plane 24 is proximate recording medium 25 whose surface 26 is brought in contact with the respective focal spots of the convergent light beams throughout a scan width x.

A uniform spot size is assured throughout the scan width x even though a curved focal plane 24 is defined throughout the scanning cycle. The lens 10 in convolution with the imaging lens 18 provides a finite conjugate imaging system which allows a large depth of focus $df$ which is coextensive with the contact loci of a spot throughout the scan width $x$ on the surface 26 of the medium 25.

Figure 4:
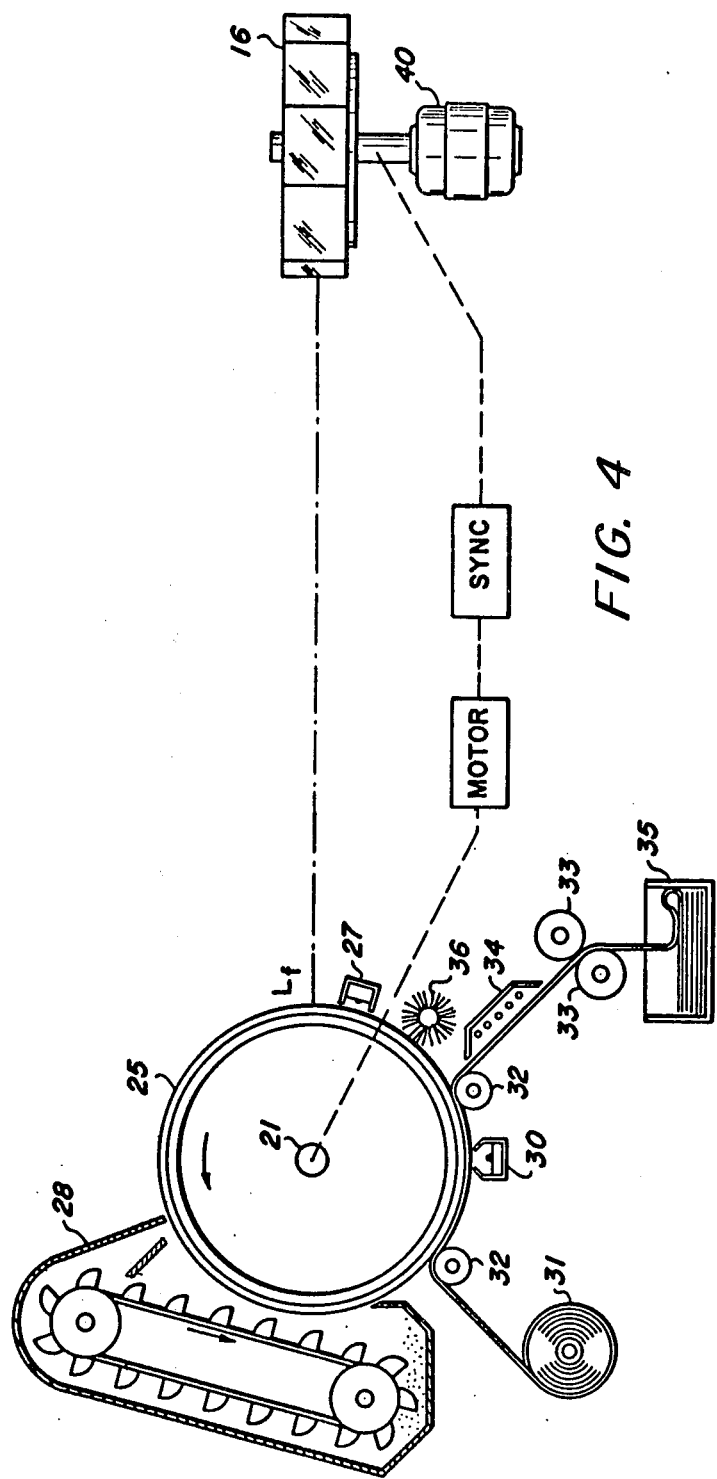
FIG. 4 is a perspective view of the utilization of the scanning beam generated by the system of FIG. 3 and embodies additional features of the invention.

As shown in FIGS. 2(a) and 4, medium 25 may be a xerographic drum which rotates consecutively through a charging station depicted by corona discharge device 27, exposure surface 26 where the beam from the rotating polygon 16 traverses the scan width $x$ on the drum 25, through developing station 28 depicted by a cascade development enclosure, transfer station 30 where a web of copy paper is passed in contact with the drum 24 and receives an electrostatic discharge to induce a transfer of the developed image from the drum 25 to the copy paper. The copy paper is supplied from the supply reel 31, passes around guide rollers 32 and through drive rollers 33 into receiving bin 35. A fusing device 34 fixes the images to the copy paper as it passes to bin 35.

Usable images are provided in that the information content of the scanning spot is represented by the modulated or variant intensity of light respective to its position within the scan width $x$. As the spot traverses the charged surface 26 through a given scan angle $\alpha$, the spot dissipates the electrostatic charge in accordance with its light intensity. The electrostatic charge pattern thus produced is developed in the developing station 28 and then transferred to the final copy paper. The xerographic drum 25 is cleaned by some cleaning device such as a rotating brush 36 before being recharged by charging device 27. In this manner, the information content of the scanned spot is recorded on a more permanent and useful medium. Of course, alternative prior art techniques may be employed to cooperate with a scanned spot in order to utilize the information contained therein.

The polygon 16 is continuously driven by a motor 40 and synchronized in rotation to a synchronization signal representative of the scan rate used to obtain the original video signal. The rotation rate of the xerographic drum 25 determines the spacing of the scan lines. It also may be preferable to synchronize the drum 25 in some manner to the signal source to maintain image linearity. The source image is reproduced in accordance with the signal and is transferred to printout paper for use or storage.

The number of facets in this preferred embodiment has been found to be optimum if at least 20 to 30 facets are employed. The scan angle $\alpha$ traversed would be equal to the number of facets chosen in relation to one complete revolution of the polygon 16. An extremely useful arrangement would have the polygon 16 with 24 facets and a scan angle $\alpha$ of 15°. Since the depth of focus $d$ and $df$ of the converging beams 22 and 23, respectively, is related to the scan angle $\alpha$ in that as the scan angle $\alpha$ increases the radius of curvature of the focal plane 24 increases, it is important to define a scan angle $\alpha$ in relation to the desired scan width $x$. For a scan width $x$ of approximately 11 inches it has been found that the scan angle $\alpha$ of 12° to 18°, with 20 to 30 facets on the polygon 16, is optimum. FIG. 2(b) is a top perspective view of the optical system shown in FIG. 2(a).

The optical system of the present invention provides a virtually 100% duty cycle scan for the entire scan angle $\alpha$ by virtue of the illumination of at least two contiguous facets (or more than two contiguous facets). The full illumination of two contiguous facets is preferred. With such illumination, another scanning spot is provided at a distance equal to the scan width $x$ behind the leading scanning spot with virtually no wait between successive scans. With the continuous rotation of the polygon 16 additional contiguous facets are subsequently illuminated, thereby providing successive convergent beams following the leading convergent beams 22 and 23 by no more than the scan angle, if so desired. Thus, a flying spot scanning system which has an extremely high duty cycle is provided.

Obviously, many modifications of the present invention are possible in light of the above teaching. It is therefore to be understood that, in the scope of the appended claims, the invention may be practiced other than as specifically described.

What is claimed is:
1. An apparatus for recording the information content of an electrical signal on the surface of a light sensitive medium by means of a plurality of scan traces across said medium comprising:
   means for providing a light beam of high intensity,
   means for modulating said light beam of high intensity to provide a light beam modulated in accordance with the information content of an electrical signal supplied to said modulator means,
   reflector means having a plurality of contiguous reflective facets rotatable about a central axis,
   means for rotating said reflector means about said central axis, and
   lens means disposed in the path of said modulated light beam for both (1) expanding the cross-sectional area of said modulated light beam such that said expanded beam illuminates more tha two contiguous facets of said reflector means at any given instant of time during each scan trace to provide a high duty cycle and (2) imaging said expanded beam to a substantially focused spot at the surface of said light sensitive medium, said lens means being disposed relative to said reflector means such that said modulated light beam travels in a plane substantially orthogonal to said central axis during the expansion thereof and during the imaging thereof to said focused spot.

2. The apparatus of claim 1 wherein said lens means is comprised of at least one lens disposed in the path of said modulated light beam between said modulator means and said reflector means for expanding the cross-sectional area of said modulated beam and at least one other lens disposed in the path of said modulated light beam between said reflector means and said medium for focusing said modulated light beam to provide said focused spot.

3. The apparatus of claim 1 wherein said lens means is comprised of at least one lens disposed in the path of said modulated light beam between said modulator means and said reflector means for expanding the cross-sectional area of said modulated beam and at least one other lens disposed in the path of said modulated light beam between said modulator means and said reflector means for focusing said modulated beam to provide said focused spot.

4. An apparatus for recording the information content of an electrical signal on the surface of a light sensitive medium by means of a plurality of scan traces across said medium comprising:

means for providing a light beam of high intensity, means for modulating said light beam of high intensity to provide a light beam modulated in accordance with the information content of an electrical signal supplied to said modulator means, reflector means having a plurality of contiguous reflective facets rotatable about a central axis, means for rotating said reflector means about said central axis, first lens means disposed in the path of said modulated light beam for expanding the cross-sectional area of said modulated light beam and disposed relative to said reflector means such that the plane in which that expanded light beam travels is substantially perpendicular to said central axis and such that more than two contiguous facets of said reflector means are illuminated at any given instant of time during each scan trace to thereby provide a high duty cycle, and second lens means disposed in said plane such that said expanded beam is imaged to a substantially focused spot coextensive with the surface of said light sensitive medium to provide successive scan traces across said light sensitive medium as said reflector means is rotated.

5. The apparatus of claim 4 wherein said second lens means is disposed between said modulator means and said reflector means.

6. The apparatus of claim 4 wherein said second lens means is disposed between said reflector means and said light sensitive medium.

* * * * *